June 26, 1962  R. B. ELBERT ET AL  3,041,441
PORTABLE STOCK WARMER

Filed May 24, 1960  3 Sheets-Sheet 1

Roland B. Elbert
Ivan L. Moritz
INVENTORS

BY Clarence A. O'Brien
and Harvey B. Jacobson
Attorneys

June 26, 1962  R. B. ELBERT ET AL  3,041,441
PORTABLE STOCK WARMER
Filed May 24, 1960  3 Sheets-Sheet 2
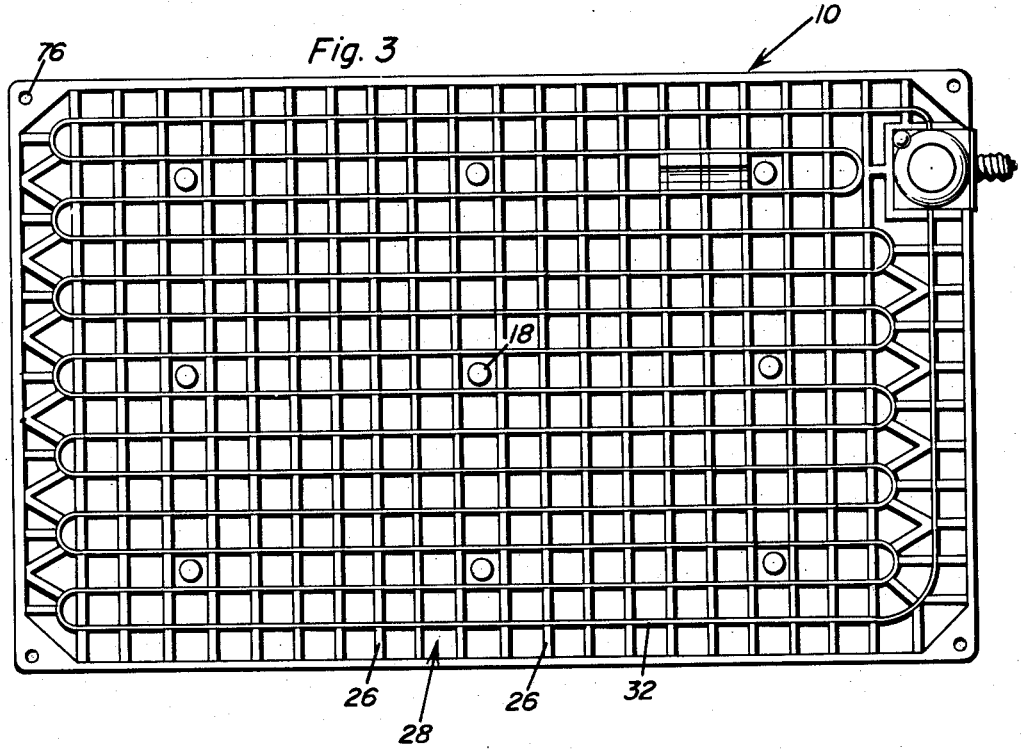
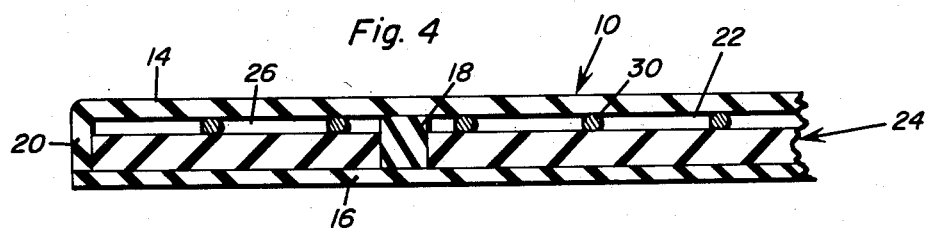
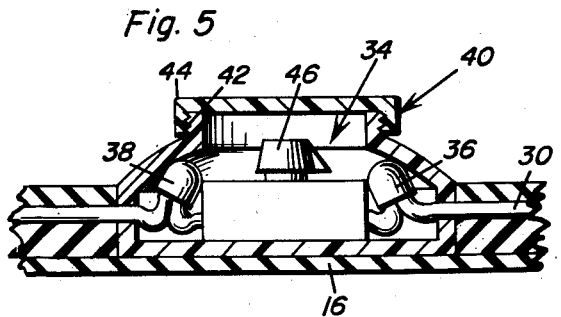
Roland B. Elbert
Ivan L. Moritz
INVENTORS
BY Clarence A. O'Brien
and Harvey B. Jacobson
Attorneys June 26, 1962 R. B. ELBERT ET AL 3,041,441
PORTABLE STOCK WARMER
Filed May 24, 1960 3 Sheets-Sheet 3
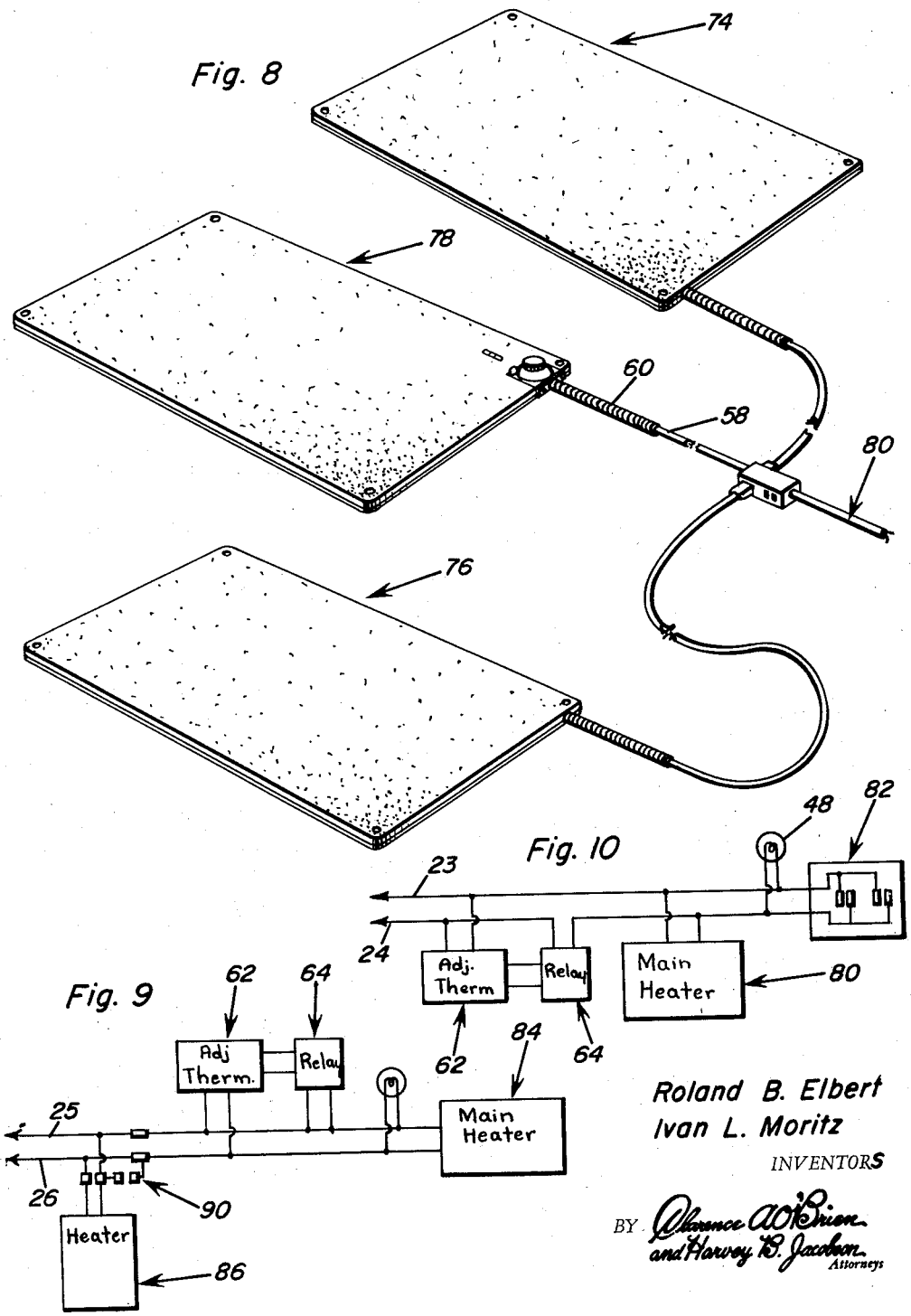
Roland B. Elbert
Ivan L. Moritz
INVENTORS

3,041,441
PORTABLE STOCK WARMER
Roland B. Elbert, Box 111, Spirit Lake, Iowa, and Ivan L. Moritz, Rte. 2, Estherville, Iowa
Filed May 24, 1960, Ser. No. 31,430
8 Claims. (Cl. 219—46)

This invention relates generally to heating means and more particularly to heating means for use in a livestock pen for heating the floor thereof for providing a dry, warm, thermostatically controlled area for young livestock and poultry to stand and lie on.

In order to assure that healthful conditions are established and maintained for young livestock and poultry, it is desirable to provide dry, warm areas. For this purpose, it has been found beneficial to provide means for heating the floors of pens and the like. It has been found too expensive to employ permanent heating fixtures which are therefore very impractical. The invention herein has for its primary object the provision of portable heating means for livestock in the form of durable mats which may be placed on the pen floor and are thermostatically controlled for assuring proper and healthful conditions.

It is a more particular object of this invention to provide novel heating means for livestock which are of relatively low cost, durable, and reliable in operation.

It is a still more particular object of this invention to provide novel heating means for livestock in the form of mats of various sizes and rated power capacities. Circuit means are provided for allowing the control of several mats by a single thermostatic element. Provision is also made for the inclusion of pilot lights for indicating when the heating cable is energized and also visible thermometers for showing the operating temperature.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 3 is an elevational view of the rectangular mat showing the upper skin removed therefrom;

FIGURE 4 is an enlarged sectional view taken substantially along the plane 4—4 of FIGURE 1;

FIGURE 5 is an enlarged sectional view taken substantially along the plane 5—5 of FIGURE 1;

FIGURE 8 is a perspective view of a plurality of mats showing how they may be energized from a single electrical energy source.

FIGURE 9 is a schematic view of one manner in which the plurality of mat heating cables may be energized; and FIGURE 10 is a schematic diagram illustrating another manner in which a plurality of heating cables may be energized and controlled from a single thermostatic element.

Figure 1:
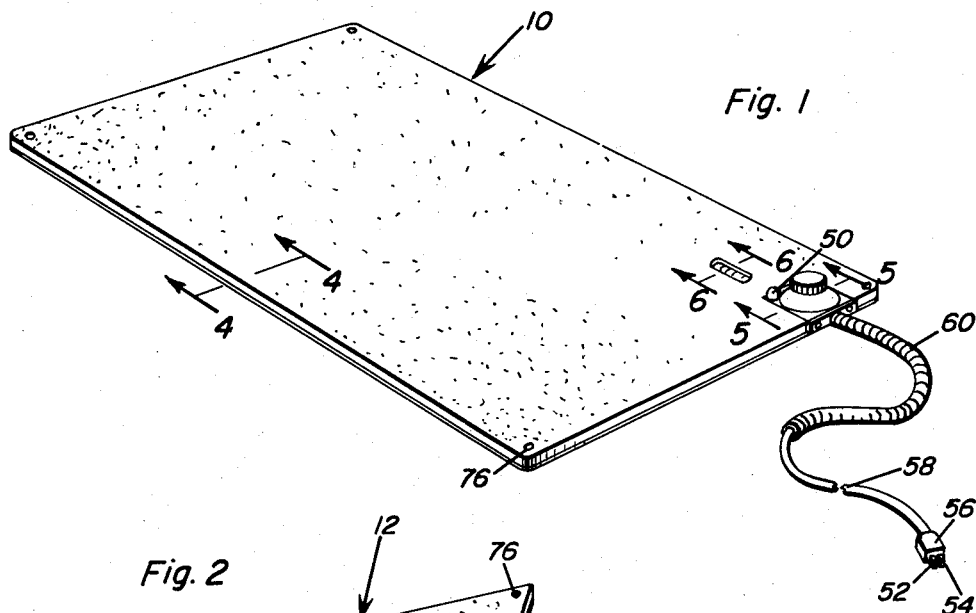
FIGURE 1 is a perspective view of a first form of the invention illustrating a rectangular mat.
Figure 2:
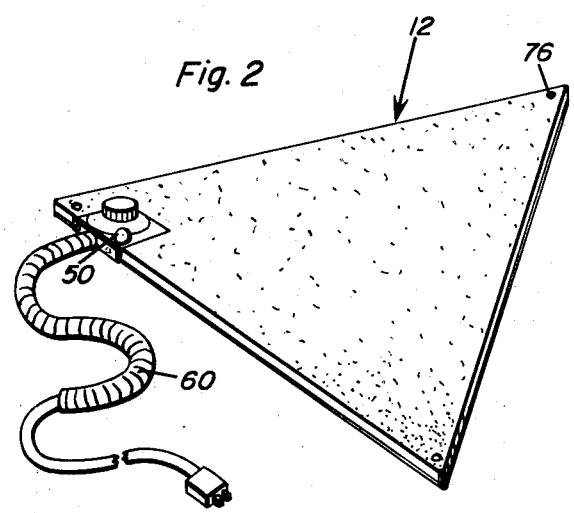
FIGURE 2 is a perspective view showing a triangular mat.
Figure 6:
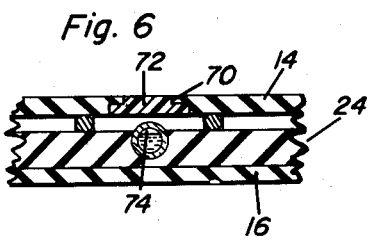
FIGURE 6 is an enlarged sectional view taken substantially along the plane 6—6 of FIGURE 1.

With continuing reference to the drawings, numerals 10 and 12 represent differently shaped mats which are receivable on floors of livestock and poultry pens for providing a dry warm area so as to assure healthful conditions for the animals. Inasmuch as the rectangular mat of FIGURE 1 and the triangular mat of FIGURE 2 are identically constructed in all respects other than their shape, particular attention will be confined to the rectangular mat of FIGURE 1 in the explanation to follow. It is initially mentioned, however, that although the sizes and rated heating capacities of the various mats may be chosen as desired, it is contemplated that each of the mats have an area of several square feet and a rated heating capacity of approximately 200-watts.

The mat 10 includes an upper skin 14 and a lower skin 16. Each of the skins 14 and 16 are made of chemically treated fiber-glass which has been impregnated with resin so as to give certain desired characteristics thereto. The skins so formed are rigid, fire resistant, electrically insulative, and substantially waterproof. Spacing pillars 18 are fixed between the skins 14 and 16 at several points therebetween. The edge of the skin 14 is folded downwardly, as particularly indicated at 20 in FIGURE 4 so as to define a closed chamber 22 between the skins.

Received between the skins 14 and 16 is a flat insulator 24 which is preferably formed of foam insulation such as expanded polystyrene plastics but which may be formed of fiber insulation or such, if desired. The flat insulator 24 has upstanding spaced ridges 26 which extend parallel to each other across the insulator 24 and define heating ducts 28 therebetween. The ridges 26 extend from the main body of the flat insulator 24 substantially into engagement with the upper skin 14. Aligned openings 30 are formed in the ridges 26 and a heating cable 32 extends through the openings 30 running perpendicular to the heating ducts 28. The heating cable 32 at one terminal is connected to the thermostatic control 34 by a connector 36 and at a second terminal to the thermostatic control 34 by a connector 38.

At one end of the mat 10 the upper skin 14 and flat insulator 24 are cut away and a housing 40 is rested on the lower skin 16 and secured thereto. The housing 10 receives the thermostatic control 34 therein and defines apertures through which the heating cable 30 passes. The housing 40 is provided with a threaded neck 42 upon which closure member 44 may be threadably engaged. The thermostatic control 34 has an adjustment knob 46 accessible through the neck 42 of the housing 40. A pilot light 48 may be disposed within the housing 40 and visible through a window 50.

Figure 7:
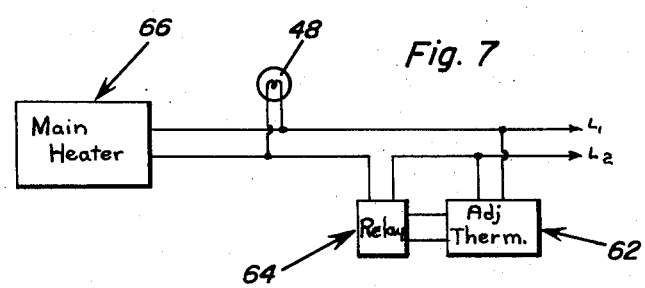
FIGURE 7 is a schematic view illustrating the manner in which the mat heating cable may be energized and thermostatically controlled.

Attention is now called to FIGURE 7 wherein a schematic illustration of the wiring circuit is shown. Initially, the conductors $L_1$ and $L_2$ are adapted to be connected to an electrical energy source which may be a conventional 115-volt outlet. The conductors $L_1$ and $L_2$ are connected to the source through prongs 52 and 54 of plug 56 and extend through insulation 58. An extra protective shield 60 is provided on the insulation 58 adjacent the mat 10 for assuring that the animals do not tear the insulation. The thermostatic element 62 is connected across conductors $L_1$ and $L_2$. A relay 64 is connected to the element 62 and responsive thereto. The relay 64 is serially connected in the line $L_2$ extending to the main heater 66 which actually comprises the heating cable 30. The pilot light 48 visible through the window 50 is connected in parallel with the heater 66. When the prongs 52 and 54 are placed across an electrical energy source, power will be delivered to the cable 30 of heater 66 through the relay 64 which makes the conductor $L_2$ continuous. Dependent upon the setting of the adjustment knob 46, the thermostatic element 62 will cause the relay 64 and heater 66 to respond to the temperature of the mat. Accordingly, the cable 30 will only consume that part of electrical power that is necessary to maintain the desired area at a particular warm temperature. The heat will be distributed through the ducts 28 and the upper skin 14 upon which the livestock and poultry may stand or lie. It is to be here noted that the upper skin 14 is provided with a roughened surface for assuring that the animals do not slip thereon.

A window 70 is defined in the upper skin 14. A transparent member 72 is placed therein and a thermometer 74 is disposed therebeneath in one of said heating ducts 28, somewhat recessed in the flat insulator 24. The thermometer 74, of course, therefore provides through the transparent member 72 a visible indication of the temperature of the mat 10.

In order to secure the mat to the pen floor, openings 76 are defined at each corner thereof for receiving therethrough fastener elements which retain the mat to the floor or, if desired, allow the mat to be hung on a wall as for storage or cleaning purposes.

Attention is now drawn to FIGURES 8 through 10 wherein means are illustrated for enabling a plurality of mats 74, 76 and 78 to be energized and controlled through a single pair of insulated conductors 80. The mat 78 may be identical to the mat 10 previously described. The mats 74 and 76 may be similar in all respects but, however, may be provided without the thermostatic control means 34. In FIGURE 10, conductors 23 and 24 may be connected to a conventional 115-volt alternating current source. As shown in FIGURE 7, an adjustable thermostatic element 62 may be energized and control relay 64 connected in line 24. The main heater 80 associated with mat 78 is connected to the lines 23 and 24 subsequent to the relay 64 and therefore the heating cable thereof becomes energized only when the relay 64 makes the line 24 continuous. A pilot light 48 may be again connected in parallel with the heater 80 so as to indicate when the heater 80 is energized. A box 82 is provided with a plurality of receptacles for energizing mats 74 and 76. The box 82 is also connected in parallel with the main heater 80 and accordingly is subject to the condition of the relay 64. It will therefore be appreciated that the thermostatic element 62 controls the operation of not only the main heater 80 but any heaters connected to the receptacles of the box 82.

In FIGURE 9 the lines 25 and 26 are connected to a plurality of receptacle outlets to which may be connected a main heater 84 and auxiliary heaters as 86. Inasmuch as the receptacles 90 are electrically disposed prior to the relay 64, the thermostatic element 62 which senses the temperature will only control the action of the main heater 84. If control of the heater 86 is desired, it of course is necessary to utilize separate elements in conjunction therewith.

From the foregoing, it should be appreciated that a novel and useful portable heating mat has been provided specifically for the purpose of warming floor areas in livestock or poultry pens for providing thermostatically controlled dry warm and healthful conditions. The particular construction of the mats including the spaced skins which are chemically treated fiberglass impregnated with resin assures safe, reliable, and durable operation. The electrical qualities of the skins prevent the animals from being electrically shocked. The heat ducts defined in the flat insulator transfer the heat to the upper skin throughout the entire surface thereof. The roughened upper skin surface prevents any slipping thereon. In passing, it is to be noted that if desired, a screen heating element may be substituted for the heating cable illustrated.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to falling within the scope of the invention as claimed.

What is claimed as new is as follows:

1. For use in a livestock pen, means for heating the floor thereof comprising an upper skin, a lower skin, a flat compressible insulator received between said upper and lower skins, rigid spacing pillars fixed between said upper and lower skins and extending through said insulator so as to prevent compacting thereof, said insulator defining heat ducts adjacent said upper skin, and a heating cable supported on said insulator.

2. For use in a livestock pen, means for heating the floor thereof comprising an upper skin, a lower skin, a flat compressible insulator received between said upper and lower skins, rigid spacing pillars fixed between said upper and lower skins and extending through said insulator so as to prevent compacting thereof, said insulator defining heat ducts parallel to and adjacent said upper skin, and a heating cable supported on said insulator, said flat insulator being formed of foam plastic material.

3. For use in a livestock pen, means for heating the floor thereof comprising an upper skin, a lower skin, a flat compressible insulator received between said upper and lower skins, rigid spacing pillars fixed between said upper and lower skins and extending through said insulator so as to prevent compacting thereof, said insulator defining relatively wide heat ducts parallel to and adjacent said upper skin, ribs separating said ducts of considerably less width than said ducts, a heating cable supported on said insulator, said heating ducts extending perpendicular to said cable and said cable extending through said ribs.

4. For use in a livestock pen, means for heating the floor thereof comprising an upper skin, a lower skin, spacing pillars fixed between said upper and lower skins, a flat insulator received between said upper and lower skins, said insulator defining heat ducts adjacent said upper skin, and a heating cable supported on said insulator, and circuit energizing means electrically connecting said heating cable to a source of electrical energy, said circuit means including an adjustable thermostat and a relay responsive to said thermostat serially connected between said source and said cable, and a thermometer located between said skins and visible from outside the heating means.

5. For use in a livestock pen, means for heating the floor thereof comprising an upper skin, a lower skin, spacing pillars fixed between said upper and lower skins, a flat insulator received between said upper and lower skins, said insulator defining heat ducts adjacent said upper skin, and a heating cable supported on said insulator, and circuit energizing means electrically connecting said heating cable to a source of electrical energy, said circuit means including an adjustable thermostat and a relay responsive to said thermostat serially connected between said source and said cable, and means electrically connecting a pilot light to said relay indicating the energization of said heating cable, and a thermometer located between said skins and visible from outside the heating means.

6. For use in a livestock pen, means for heating the floor thereof comprising an upper skin, a lower skin, spacing pillars fixed between said upper and lower skins, a flat insulator received between said upper and lower skins, said insulator defining heat ducts adjacent said upper skin, and a heating cable supported on said insulator, and circuit energizing means electrically connecting said heating cable to a source of electrical energy, said circuit means including an adjustable thermostat and a relay responsive to said thermostat serially connected between said source and said cable, a window defined in said upper skin, a thermometer visible through said window disposed in one of said ducts.

7. For use in a livestock pen, means for heating the floor thereof comprising an upper skin, a lower skin, spacing pillars fixed between said upper and lower skins, a flat insulator received between said upper and lower skins, said insulator defining heat ducts adjacent said upper skin, and a heating cable supported on said insulator, said skins being formed of resin impregnated fiberglass, said upper skin having a roughened non-slip surface, said flat insulator being formed of plastic foam material, said heating ducts extending perpendicular to said cable and directly below and parallel to said upper skin, and circuit energizing means electrically connecting said heating cable to a source of electrical energy, said circuit means including an adjustable thermostat switch.

8. A livestock heating device comprising an insulator pad enclosed by an upper and a lower skin of electrical insulating material, a plurality of parallel spaced ribs formed on and extending across the upper surface of said insulator pad and defining heating conducting air passages therebetween, a plurality of spaced heating wires extending across the top of said pad generally normal to said ribs and lying adjacent the upper skin, said ribs having notches receiving said wires, the air in said passages permitting the heat from said wires to be transmitted by convection and radiation to the outer surface of said upper skin and said insulator preventing heat from being transmitted to the lower skin.

References Cited in the file of this patent

UNITED STATES PATENTS

| | | |
|---|---|---|
| 1,718,412 | Crocker et al. | June 25, 1929 |
| 2,185,692 | McCleary | Jan. 2, 1940 |
| 2,502,519 | Grey | Apr. 4, 1950 |
| 2,513,733 | Morris | July 4, 1950 |
| 2,612,585 | McCann | Sept. 30, 1952 |
| 2,619,580 | Pontiere | Nov. 25, 1952 |
| 2,710,909 | Logan et al. | June 14, 1955 |
| 2,715,674 | Abbott et al. | Aug. 16, 1955 |
| 2,719,907 | Combs | Oct. 4, 1955 |
| 2,842,651 | Neely | July 8, 1958 |
| 2,866,066 | Neely | Dec. 23, 1958 |
| 2,873,352 | Franco | Feb. 10, 1959 |
| 2,884,509 | Heath | Apr. 28, 1959 |
| 2,927,989 | Weber | Mar. 8, 1960 |
| 2,938,992 | Crump | May 31, 1960 |
| 2,948,802 | Shaw | Aug. 9, 1960 |
| 2,952,001 | Morey | Sept. 6, 1960 |

FOREIGN PATENTS

| | | |
|---|---|---|
| 983,731 | France | Feb. 14, 1951 |